Jan. 8, 1929.  T. ROBINSON  1,698,242
BUILDING MATERIAL
Filed Oct. 5, 1926  3 Sheets-Sheet 1
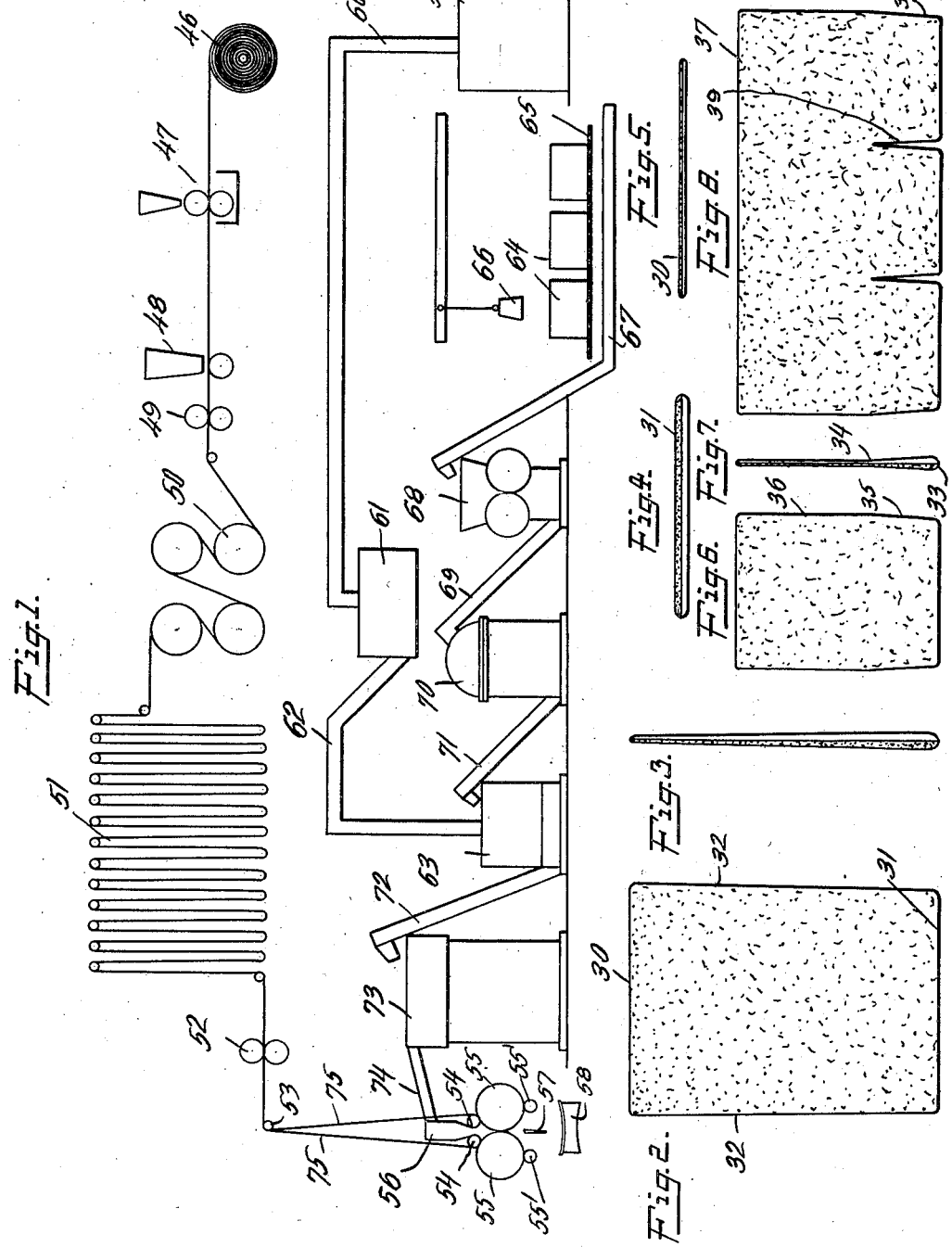
INVENTOR
Thomas Robinson
BY
Pennie, Davis, Marvin Edmonds
ATTORNEYS

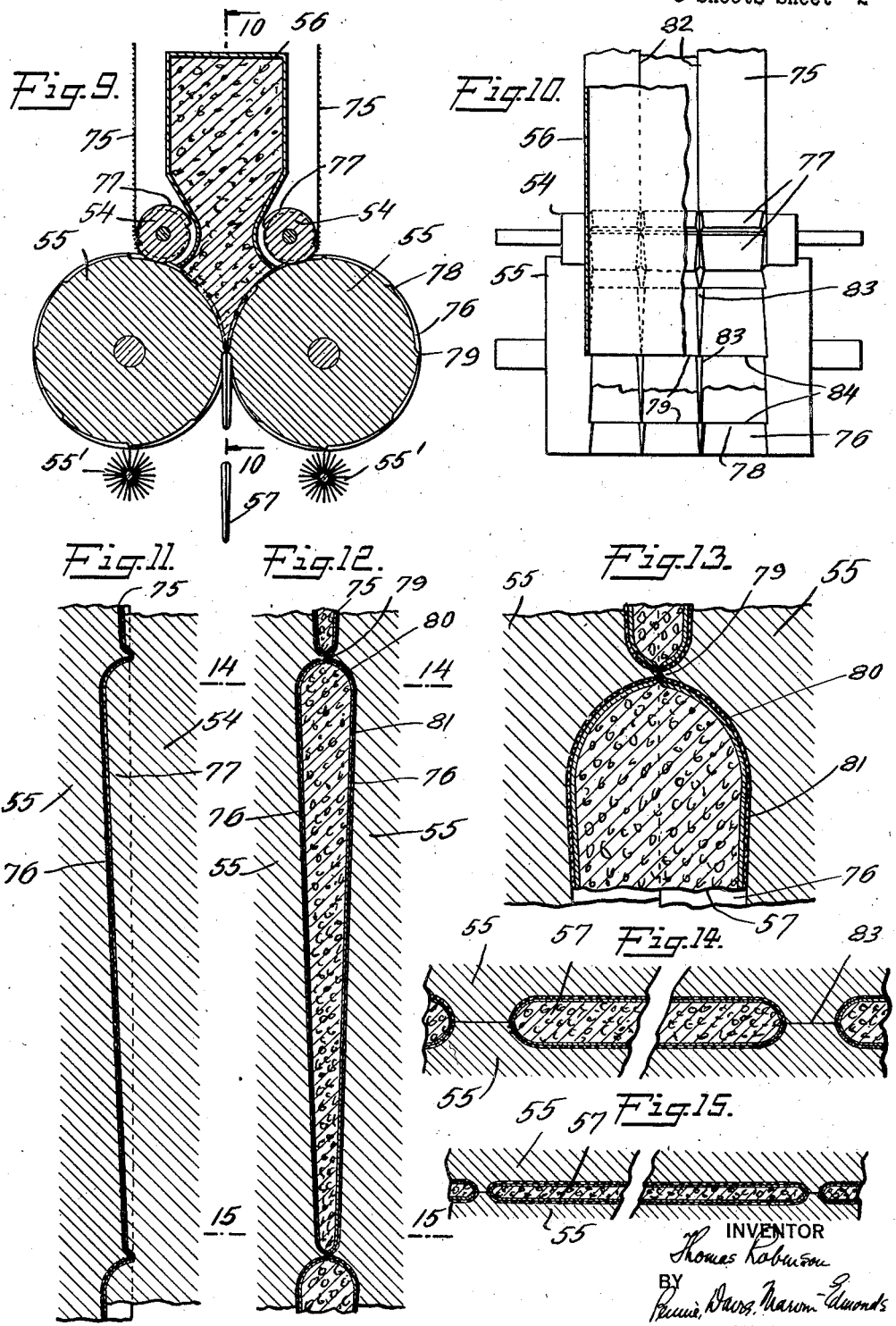

Jan. 8, 1929.  T. ROBINSON  1,698,242
BUILDING MATERIAL
Filed Oct. 5, 1926   3 Sheets-Sheet 3
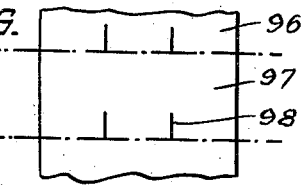
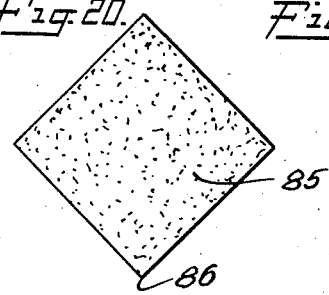
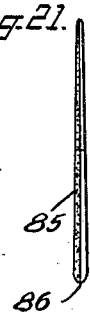
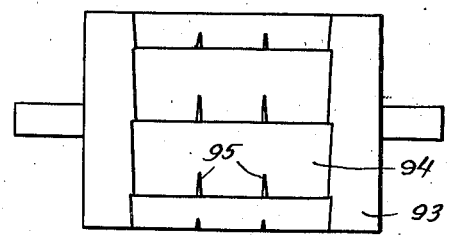
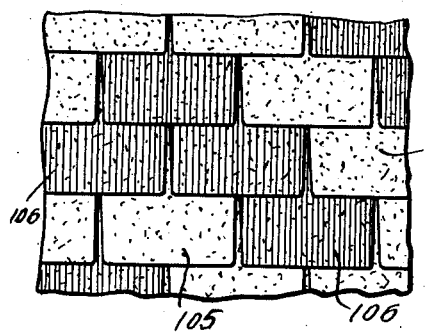
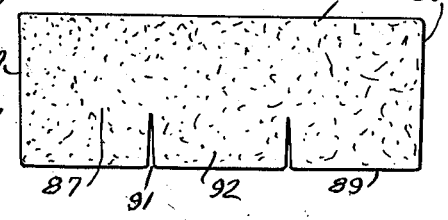
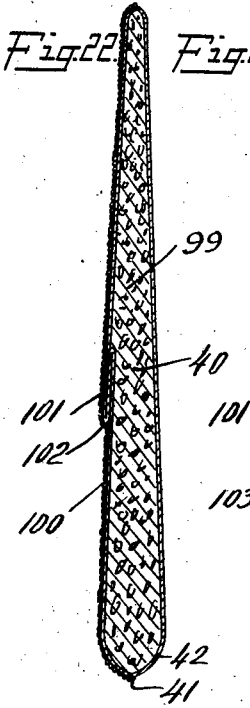
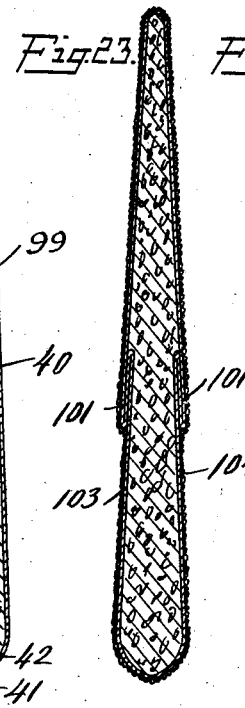
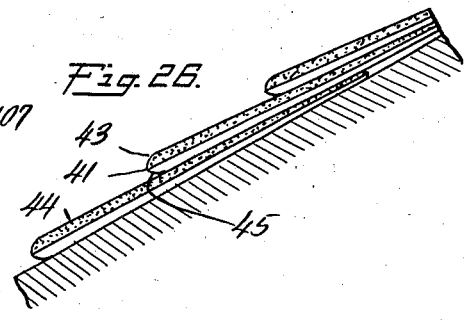
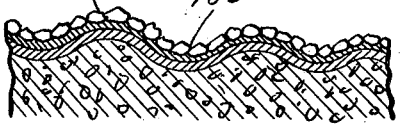
INVENTOR
Thomas Robinson
BY
ATTORNEYS Patented Jan. 8, 1929.

1,698,242

UNITED STATES PATENT OFFICE.

THOMAS ROBINSON, OF NEW YORK, N. Y., ASSIGNOR TO LANCASTER ASPHALT, INC.

BUILDING MATERIAL.

Application filed October 5, 1926. Serial No. 139,612.

This invention relates to materials suitable for use in building construction and more particularly to an improved product which may be made in different forms and shapes to be used as roofing, siding, and the like. The invention includes not only this novel product, but also methods of making it and apparatus by which such methods may be practiced.

The new product while capable of being used to advantage in many ways, is probably of greatest utility as a roofing material, replacing shingles either of wood or of the so-called "prepared" roofings of impregnated felt, asbestos cement, and other similar materials. Accordingly, for purposes of description and illustration, it will be frequently referred to hereafter as roofing and different forms of the material especially adapted for that purpose and methods of making such roofing elements will be set forth in detail, though it is to be understood that the utility of the product is by no means limited to any particular use and its use as roofing is merely typical of its wide application in building construction.

Prepared roofing now in widest use consists of a felted sheet saturated and coated with asphalt. This sheet material is used as a roll roofing or in the form of shingles, either single or multiple, and for the latter use, the felt is commonly provided with a wear surface of granular material such as crushed slate. Such roofing is cheaper and more resistant to fire than ordinary wood shingles, but the felt is relatively expensive and the shingles made from it are quite thin, so that the roof does not have the attractive appearance which results from the use of thick butt shingles which cast a considerable shadow.

The present material differs from those heretofore commonly used for the manufacture of roofing products in that the major part of the product is made of a hardened plastic material which is provided with a protective jacket. This jacket not only covers both faces of the mass or core of the plastic material but also preferably extends over its side and end edges, thus reinforcing and protecting the core and also preventing its extrusion at the edges when laid, due to pressure. The encased core is completed by the application of a sealing layer and a wear material of a suitable type affixed to the jacket.

The materials which may be used in the core cover a wide variety of substances which have the property of becoming hard on setting. I prefer to employ a bituminous material, such as asphalt, as a binder and with this mix a finely divided solid material, such as crushed slate, or granite, sand, fine rock, or the like. But instead of a mineral material which gives the product considerable weight, it may be desirable in some instances to employ saw dust, asbestos sand, fibrous asbestos, granulated cork, etc. Infusorial earth may also be used, or suitable mixtures of the above substances. Instead of using a bituminous binder, it is possible to use cementitious materials of various kinds, the materials being selected so that the mixture of binder and solid will, upon setting, form a compact, substantially rigid body. I prefer asphalt for the purpose because of its cheapness and easy working qualities and because a product made from it may be readily cut, or pierced by nails, but it is evident that the binder used should be one which will not be detrimentally affected by solar heat and if asphalt is employed, it should have a suitable melting point, for example 180°–220° F.

The jacket to be used is preferably a flexible fibrous sheet of relatively light weight, and a heavy coarse paper may be satisfactorily used, either impregnated with water-resistant material or not, as may be desired. Other materials than paper may be employed but paper of a cheap grade serves the purpose satisfactorily and is easily handled.

In the manufacture of the new product, a quantity of the core material is placed between a pair of jacket sheets and then the core and jacket are subjected to a molding operation by the application of pressure. The pressure is applied by means of molding surfaces of appropriate form which act to consolidate and shape the core material and to press the jacket into thorough contact with all portions of the core. These molding surfaces are preferably arranged with cutting or pinching edges which outline the shape of the finished product and their action therefore is not only to give the core the desired shape but also to cut the sheets around the outline of the core.

The sheets used for the jacket are preferably saturated and coated with a water-resistant material such as asphalt and given their coating of wear material prior to their introduction with the core material between the molding surfaces, so that after the action of the latter, the product is finished and ready for immediate use. Also, I prefer to carry on the molding and cutting operations by rotary presses, as such apparatus greatly simplifies the feeding of the jacket and core material.

For a better understanding of the invention, reference will be made to the accompanying drawings, illustrating the new product in various forms and also the apparatus by which it is made. In these drawings, Fig. 1 is a conventional view in side elevation illustrative of the steps in the method and the apparatus used, Fig. 2 is plan view of a single roofing element or shingle made of the new material, Fig. 3 is a view of a single shingle in side elevation, Fig. 4 is an end view of the thicker or butt end of the same, Fig. 5 is an end view of the thin end, Fig. 6 and Fig. 8 are plan views of a modified form of shingle in individual and strip form, respectively, Fig. 7 is a side view of the shingles shown in Figs. 6 and 8, Fig. 9 is a sectional view of the molding mechanism, Fig. 10 is a sectional view on the line 10—10 of Fig. 9, Fig. 11 is a sectional view of a development of one pair of rolls used in the molding apparatus, Fig. 12 is a sectional view of a development of the molding and cutting rolls illustrating the formation of a tapered shingle, Fig. 13 is an enlarged sectional view of a portion of Fig. 12 showing the cutting edges, Figs. 14 and 15 are sectional views on the lines 14—14 and 15—15 respectively of Fig. 12, Fig. 16 is a diagrammatic view illustrating the cutting of the webs in producing a strip shingle, Fig. 17 is a face view of a molding drum, used for making strip shingles, Figs. 18 and 19 are plan and side views respectively of the shingles produced by means of the drum of Fig. 17, Figs. 20 and 21 are plan and side views respectively of a diamond type shingle made by the new process, Figs. 22, 23 and 25 are longitudinal sectional views of modified forms of the new product, Fig. 24 is a plan view of a portion of a roof composed of two tone reversible shingles made by the new process, Fig. 26 is a side view showing the manner of laying the new shingles, and Fig. 27 is an enlarged sectional view illustrating an irregular surface shingle which may be made by the new process.

Referring now to the drawings, one form of the new material is illustrated in Fig. 2, this material having the form of an individual shingle of gradually tapering section with its rear thin edge 30 of slightly greater length than its forward edge 31. The lateral edges 32 converge slightly from the rear edge to the thick or butt edge 31 and when these shingles are laid side by side in courses, they are placed subtantially in contact at their rear ends and the exposed portions at the butts then lie separated a slight distance due to the shorter transverse dimension of the butt.

In the form illustrated in Fig. 6, the single shingle has an increased thickness at its butt end 33, but the major portion of the shingle is of uniform section, the thickness increasing from the point 34 to the bottom edge and this point lying slightly to the rear of the normal exposure of the shingle. From this point 34 the lateral edges converge, as at 35. Thus, when the shingles are laid in the usual courses with the straight portions of their lateral edges 36 in contact, the exposed portions appear to have a considerable thickness, due to the thickened butts. These butts are separated by spaces between them so that the shingles have the same general appearance as the ordinary wooden shingles which are laid in spaced relation.

In the strip shingle illustrated in Fig. 8, the main body 37 of the shingle has a length corresponding to the widths of three separate elements, and at its front edge tabs 38 are formed by notches 39, these notches extending inwardly from the butt end of the shingle and converging as illustrated. This element made be made either with a gradual taper from one end to the other, as shown in Fig. 3, or else it may have the section shown in Fig. 7, only the tabs having the tapering section.

All of the elements illustrated consist of a body of plastic material 40 (Fig. 22) which is made up of a finely divided solid substance, which for convenience may be termed an "aggregate", and a binder. This solid material may be of various types, of which examples have previously been given, and the binder is preferably a bituminous compound, such as asphalt. The plastic material is formed by appropriate treatment to the desired shape and it is encased in a jacket which covers both faces of the body and of all its edges. The body is thus completely enclosed in the jacket and the body of plastic material is thus strengthened and reinforced. Furthermore, by the use of this jacket, as will presently appear, the formation of the body of plastic material is greatly simplified and in addition, warping or bulging of the plastic material is prevented. The jacket which I prefer to use is a cheap coarse paper which may be impregnated with a waterproofing compound, such as asphalt of a suitable melting point.

In the production of these elements a pair of facing sheets of the paper are placed on either side of a quantity of plastic material and then the paper and the material are acted on by suitable molding means which consolidates and molds the plastic material to the desired shape, forces the paper into intimate contact with it, and wraps the paper over the edges. Preferably in the formation of the shingles, the size of the paper is selected with reference to the size of the final core of plastic material, so that the edges of the paper meet at the edges of the core, as at 41, Fig. 22, and in the shaping process the edges of the core are somewhat rounded and the meeting edges of the paper thus lie between the planes of the faces of the core.

An element of this type which may conveniently be made by a molding operation has its extreme edges lying between the planes of the faces with the faces tapering toward these edges with a gradual curve, as at 42. Each edge of the element illustrated in Fig. 22, therefore, has a section somewhat similar to a pointed arch, and when these elements are laid in overlapping courses in the usual manner, as shown in Fig. 26, the butts 43 appear to have a considerable thickness because the extreme butt edge 41 lies spaced above the surface of the element 44 next beneath. Owing to the curve of the under surface of each element, as at 45, there is a considerable distance between the point of contact of the upper element with the surface of the lower element and the extreme butt edge 41 and thus, each element casts an exaggerated shadow, which causes the butt end to have a greater apparent thickness.

In the manufacture of the new product, the process employed is that illustrated diagrammatically in Fig. 1, and the jacket material in the form of a pair of webs is drawn from a supply roll 46. This roll may consist of two webs wound about a single core or the supply of jacket material may take the form of a pair of webs on separate cores. When the double web is used, it is drawn from the supply 46 and the webs with their adjacent faces in contact pass through a coating mechanism, illustrated conventionally at 47. This mechanism may be of any standard form and includes upper and lower rolls, together with other appropriate means by which a coating of water-resistant material may be applied to the outer faces of the two webs passing through the rolls in contact. This water-resistant material is to act as a sealing coat, and I prefer to employ an asphalt of a suitable melting point to withstand solar heat for this purpose.

Beyond the coating mechanism 47 the two webs pass through a surfacing mechanism generally designated 48. This mechanism is arranged to apply a suitable surfacing material to the webs, and it consists of a hopper for the material which may be crushed slate or the like, and the pressing rolls 49 for embedding the granular material in the coating on the webs. The apparatus 48 may be arranged to apply granular material to the faces of both webs, or to apply a granular material to the outer face of one web, and a non-stick material, such as talc, to the outer face of the other web. The devices 48 and 49 are of standard construction commonly used in the roofing industry and need no further description. Beyond the devices 49, the coated webs are led around water-cooled rolls 50 for the purpose of cooling and hardening the coating layers. Thereafter the webs are led together through a loop-cooling system 51, such as is commonly used in the roofing manufacture, this system being arranged to pass the webs along in depending loops or festoons, so that the travel of the webs is very slow and they may be cooled by exposure to the air.

After being cooled, the webs pass through cutting rolls 52 which, in some instances, may be dispensed with. These rolls may be employed when the webs have a greater dimension than the shingles which are to be made from them. For example, a 36" web may be used for the production of shingles of 10", 12", and 14" width. When shingles of this type are made from a wide web, the web is slit by means of the cutting rolls 52 into three sub-divisions of 10", 12" and 14" width.

Passing from the slitting rolls 52, the webs are led around a guide roll 53 and then are moved in spaced relation around rolls 54. These rolls may be used to force the webs into contact with molding cylinders 55, which have cavities in their faces, the rolls 54 having projections which force the webs into the cavities, thus shaping the webs to facilitate succeeding operations. In the space between the separated webs is a hopper or receptacle 56, into which the core material of the shingles is placed, this hopper being open at the bottom to discharge the core material into the bite of the cylinders 55. As the webs pass between rolls 54 and 55, each web is forced into the cavities in one cylinder and as the cylinders rotate with the webs in place in their cavities, a quantity of core material discharged from the receptacle 56 enters between successive cavities and then is carried between cylinders 55. In such operation the plastic material is pressed by the cylinders to consolidate the plastic mass and to mold it to appropriate form, the cylinders also acting at the same time to force the webs into intimate contact with the plastic body. The cylinders 55 are also provided with cutting edges around the mold cavities, so that when the molding operation is completed, the edges of the web around the plastic body shaped by the molds are severed or trimmed. The further rotation of the cylinders causes the severed elements 57 to be discharged upon a conveyor 58 which transfers these products to an appropriate point. Cleaning means, such as brushes 55', clean the faces of the mold cavities after the elements are discharged therefrom.

The preparation of the core material may be carried on simultaneously with the preparation of the webs. The apparatus illustrated is intended to be used to produce an element having a core of a bituminous binder and finely divided solid material, and the bituminous binder used is asphalt which may be mixed with solid material in dry condition and then heated to produce a plastic mass. The apparatus therefore includes a bin or receptacle 59 for the solid material which is conveyed from the bin by a suitable conveyor 60 to a heating device 61, the purpose of this device being to raise the temperature of the material to facilitate the ready heating of the asphalt. From the heating device 61 another conveyor 62 transfers the solid material to a measuring apparatus 63. The conveyers, the heating devices, and the measuring device are all standard commercial types and need not be further described.

The asphalt is received in drums which are stripped from the solid masses and then these masses of asphalt 64 are placed on a grille 65 over which is a so-called skull breaker 66. This is a heavy weight which is raised by appropriate means and then allowed to fall on the asphalt masses, crushing these masses and breaking them into fine fragments. The grille is of suitable construction, such that the asphalt is broken into relatively fine chunks before it is free to pass through the spaces of the grille to be discharged upon a conveyor 67. This conveyor transfers the asphalt to a standard breaking mechanism 68, where the pieces of asphalt are broken into fine fragments and these fragments are then transferred by another conveyor 69 to a pulverizer 70. This pulverizer is a standard commercial device, preferably of the beater type, and grinds the asphalt into the form of a powder. A conveyor 71 transfers the asphalt powder to the measuring device 63 from which measured quantities of asphalt and the solid materials are discharged continuously. These materials are conveyed by a suitable conveyor 72 to the mixer 73, which is preferably steam heated so that the asphalt is softened and, with the solid material, forms a plastic mass. This material is transferred from the mixing device by a conveyor 74 of appropriate form to the receptacle 56. Other methods may be employed for the preparation of the plastic mixture if desired.

The details of the mechanism by which the articles are produced are illustrated more clearly in Fig. 9. In this figure the separated webs 75 are shown as being provided with wear surfaces on their outer faces and these webs are led past the receptacle 56 in spaced relation. The receptacle contains the plastic mixture of asphalt and solid material prepared in the manner described. The webs pass down around the rolls 54 which cooperate with the molding drums 55. The drums 55 have cavities 76 in their faces and the rolls 54 may have projections 77 which have a shape corresponding to these cavities. As each web passes around the roll 54 the rotation of the latter, which is accomplished by a suitable driving mechanism, causes its projections 77 to force the web into the successive cavities 76 in the cylinder 55, and as the cylinders are then rotated, the webs travel with them, with portions of the webs lying in the bottom of the cavities. The receptacle 56 is so placed that it discharges the plastic material into the bite of the two cylinders 55, the material thus entering the space between the uncoated faces of the webs. As the cylinders rotate, a quantity of the plastic material is seized between a pair of cooperating cavities and these cavities are so formed as to give this mass of plastic material the desired shape.

As shown in Fig. 12, the cavities in the two cylinders 55 are arranged to produce an element of tapering section, and the shallow end of each cavity, as at 78, lies in advance of the deeper portion in the direction of movement of the rolls. Thus, as the cylinders rotate, the cooperating cavities tend to seize a quantity of the material discharged from the receptacle and when the cavities move into cooperating position, this material is compacted, solidified, and molded so as to fill the cavities completely and to assume the shape defined by them. At their outlines the cavities are defined by knife edges 79 and when these edges come into contact, they sever the webs so that the element has the outline of the cavities and its section corresponds to the combined sections of the cavities. The cavities have sloping walls 80 leading from the flat surface 81 of each cavity to the knife edges 79, and it will thus be seen that the finished product includes a mass of plastic material which has been given a selected shape by a molding operation, and this plastic core is completely encased by a jacket made of the webs. The edges of the webs are severed at the extreme edges of the cavities, and the extreme edges of each element lie between the planes of its upper and lower surfaces.

Owing to the manner in which the new product is made by means of the rotary molding devices, with the thin end of the product being formed first, the plastic material between the jacket sheets at the thin end of the shingle undergoes a greater compacting pressure than is applied to this material at the thick end. This is due to the fact that when the molding cylinders are in position with the cutting edges at the thin end of a shingle about to be formed in contact, the plastic substance from the receptacle 56 enters the space between the two jacket sheets and as the cylinders rotate, the plastic material nearest the point of contact of the cutting edges is subjected to great pressure, while that material somewhat above the actual point of contact of the cylinders is free to move upwardly and is thus forced toward the mass in the receptacle, this movement of the material continuing substantially until the cylinders have formed the complete shingle. The action of the cylinders on the plastic material, as illustrated particularly in Figs. 14 and 15, is somewhat similar to an extrusion operation, the plastic material between the cylinders being forced by the rotation of the cylinders upwardly toward the main mass of the material through an orifice of gradually increasing cross-sectional area. The space between the cylinders taken on the section line 15—15 is illustrated in Fig. 15, and as the cylinders rotate, the mass which lies between them is forced upwardly through an orifice defined by the faces of the cylinders and the knife edges, this orifice being of gradually increasing cross-section and finally attaining the shape illustrated in Fig. 14, after which it abruptly changes in cross-section, until it is closed by the contacting of the cutting edges 79. The result of this action is to produce an article of tapered shape in which the plastic material is more forcefully acted on and compacted in the thin end of the shingle than in the thick end. As a consequence, the core has its greatest density at the thin end and its density gradually decreases toward the thick end. This increased density at the thin end makes this end somewhat more rigid, and in the finished product the density of the core varies from end to end of the material, but the rigidity of the article does not vary substantially, owing to the fact that the mass of core material, while of diminishing density at the thick end, is present in greater amount.

In Fig. 11 there is shown a development of a portion of a cylinder 55 and the cooperating roller 54. The drum is shown as having a cavity 76 into which enters the projection 77 on the roll. The web 75 which is coated with asphalt and also with the layer of granular material, is forced into the cavity 76 by the projection 77 and by thus preliminarily shaping the web by forcing it into the cavity, the complete filling of the cavities by plastic material is assured. If the webs were not thus first forced into the cavities, a sufficient quantity of plastic material to completely fill the molds may not be taken up but this difficulty is readily avoided by the use of the preliminary shaping rolls.

The web used may be of the width of a single shingle, or of a plurality of shingles, or it may have a width appropriate for the manufacture of a strip shingle. In Fig. 10 the web 75 has been slit into three subdivisions along the lines 82, these subdivisions being such as to form shingles of three different widths. This web passes around the roll 54 which has three sets of projections 77. These projections cooperate with a drum 76 which has three sets of mold cavities 78. These mold cavities are arranged side by side so that each subdivision of the web is forced into one cavity by an appropriate projection on the roll 54. It will be noted that there is a space 83 between adjacent cavities in a row extending lengthwise of the cylinder 76. This is due to the elements being made from a straight web 75 but having a tapering section. As the webs are of uniform width throughout, it is apparent that if a pair of such webs are to completely encase a core of tapering section, this core must have a diminished width at its thickened end. Accordingly, the molds are formed so that while the element has an increased thickness at one end, the peripheral measurement of the element remains uniform throughout. Thus a uniform web may be used to make products of varying taper, the width of these products decreasing as the thickness increases, so that their peripheral measurements are unchanged throughout their length. When the web is slit lengthwise, as is shown in Fig. 10, it is of course not necessary to give the mold cavities a cutting edge along the side edges of the element, and the knife edges are placed only at the ends of the mold cavities, as indicated at 84.

The drums 55 which carry the mold cavities are preferably readily demountable, so that different drums may be substituted, in accordance with the type of material that is to be used. These drums may be used to produce a single element shingle, such as is shown in Fig. 2, or the strip shingle shown in Fig. 8. By appropriately forming the drums, many other types of product may likewise be produced and such products may have a uniform or tapering section as desired, and may have any desired outline.

One such product differing from those previously described, is that shown in Fig. 20 and designated 85. This element is of substantially square shape, or it may be slightly diamond shape. It has a tapering section, with the part of greatest thickness lying at one of the points 86, this point being the part of the shingle which is to be exposed in ordinary construction. Such a product as this may readily be produced by the new method by appropriately forming the mold cavities to secure the greater thickness of material at the point, instead of along one edge.

Another type of shingle which may readily be made by the new process is the strip shingle illustrated at 87 in Fig. 18. This element, as shown in Fig. 19, is of gradual taper from its rear edge 88 to its butt edge 89, and the side edges 90 slightly converge. In the butt edge are formed notches 91 which converge toward the rear, these notches defining tabs 92. Such an element as this is produced by a molding drum, as illustrated at 93 in Fig. 17. This drum has cavities 94 with knife edges 95 which slit the webs and form the notches in them at the same time that these webs are applied to the body of the core. Fig. 16 illustrates a length of web 96 prior to its actual application to the core. The portion 97 which is used for the product shown in Fig. 18 is a rectangle with slits 98 formed along one edge. Owing to the tapering section of the core to which this rectangular piece of the web is to be applied, it is evident that the width of the core must decrease as its thickness increases. Accordingly, the element 90 has a butt edge 89 which is of less length than its thin edge 88 and although the web is merely slit, as at 98, prior to its application to the core, the thickness of the tabs of the core causes the edges of the web at the slits to be separated to form the notches 91. With this shingle, therefore, the peripheral measurement at a point between the butt and thin edges to the rear of the notches is equal to the sum of the peripheral measurements of all the tabs.

In Figs. 22, 23 and 24, modified forms of the product which may be produced by the new method are illustrated. In the product shown in section in Fig. 22 the core 99 is of tapering thickness and the jacket has a wear surface on one face 100, the rear face being plain. The jacket material which is used for this upper face is folded upon itself at 101 to provide increased thickness resulting in an offset at 102. This offset is disposed at the rear edge of that portion of the shingle which is normally exposed, so that when the shingles are laid in courses the shingle next above the one illustrated will lie with its forward edge resting on the offset portion, and thus the butt of the upper shingle will be slightly raised, giving it the appearance of having an increased thickness.

In the element shown in Fig. 23, both faces 103 and 104 are provided with granular coatings and both jacket sheets have the folded portions 101. The shingle illustrated is of reversible form and in the preparation of the webs a granular material of one color or type may be applied to the face 103, and a granular material of another color to the face 104. As this shingle is symmetrical with reference to its longitudinal axis, either face may be laid uppermost, and thus a single product may be used to give a two-tone roof, as illustrated in Fig. 24. The shingles designated 105 are laid with one face uppermost and the shingles 106, with the other face uppermost. Such a roof as this is highly desirable due to the blended color effect, and the present shingles provide an easy method of securing it, without the necessity of using shingles of two different kinds.

The element illustrated in Fig. 25 is constructed in the same manner as those previously described except that the under surface 107 is flat. Such a material is produced by using a pair of molding drums, one of which has a straight surface, while the other has curves or mold cavities of greater depth than is ordinarily employed. This material is particularly useful in certain special applications. Preferably the under surface 107 is not provided with the wear material, but is either uncoated or else covered with anti-stick material.

In Fig. 27 there is illustrated on enlarged scale, a portion of a product which has been given an irregular upper face. The irregular surface is due to the formation of crests 108 and depressions 109 in one face of the product, this being done by forming the faces of the mold cavities in the molding cylinders with small knobs or other irregularities which produce the effect illustrated in this figure. A roofing product having such an irregular surface is particularly desirable as the irregularities tend to give a roof formed with these elements an exaggerated roughened appearance producing a pronounced texture.

It will be seen that the new material is capable of wide application and may be made in various forms, so that it may be used for numerous purposes. It is particularly useful as a roofing material and that form has been described in detail, although it is evident that it may likewise be used for siding purposes, and also in many other ways in building construction. Also the product has been described as consisting of an asphaltic material and a binder, with the asphaltic material mixed in dry form with the binding material. By mixing the asphaltic material in powdered form, it is possible to produce a filling or core material in which there is a relatively large proportion of the aggregate to the binder, but the process may, if desired, be carried on by the use of the bituminous or asphaltic material in fluid form, in which event the liquid asphalt is not preliminarily ground, but simply heated and then mixed with the binder just before this mixture is to be delivered to the hopper 56. Under ordinary circumstances, this hopper, which may be appropriately heated, will discharge its contents by gravity without the use of any mechanical feeder, but, if desired, the hopper may be provided with an agitator of any convenient type which will force the material through it into the bite of the molding cylinders.

In the manufacture of the single and strip shingles, as illustrated, it will be noted that the jacket webs which are used to encase the core are used without cutting portions therefrom to produce the single elements which have a varying width. In the case of a multi-unit shingle, this results in the formation of notches of tapering form, but in some instances it may be desirable to employ notches having straight sides, in which event the molding drums are provided with knife edges of appropriate form to produce the desired result. Likewise, it is not necessary that the product produced by this method should have a tapering section and for some purposes it may be desirable to produce a flat element of uniform thickness from one end to the other. This is readily done by a proper formation of the molding drums.

The apparatus described includes rotary molding devices, so that the product may be produced with a continuous movement of the webs. It may likewise be produced, however, as is evident, in a molding device or press of the reciprocatory type, the feeding of the webs and the core material being intermittent, with the pressing operation taking place in the periods of rest of such movement.

I claim:

1. A product suitable for building purposes, which comprises a core of molded material, and a two-piece jacket of fibrous material completely encasing the core, the edges of the jacket pieces meeting without substantial overlap.

2. A product suitable for building purposes, which comprises a core of hardened plastic material resistant to weather, and a two-piece jacket of flexible fibrous material impregnated to be water resistant and completely encasing the core, the jacket being so applied that all parts of the core are covered by a single thickness only of jacket material.

3. A product suitable for building purposes, which comprises a plate-like body of varying width and cross-section and having a substantially constant peripheral measurement.

4. A product suitable for building purposes, which comprises a plate-like body of tapering section and of decreasing width in the direction of increase of section, the transverse peripheral measurement of the body remaining substantially constant throughout its length.

5. A product suitable for building purposes, which comprises a plate-like body having extending tabs which are of varying width and thickness such that the transverse peripheral measurement of each tab remains substantially constant throughout its length.

6. A product suitable for building purposes, which comprises a plate-like body having extending tabs which are of varying width and thickness such that the transverse peripheral measurement of each tab remains substantially constant throughout its length and the sum of the said peripheral measurements of the tabs is substantially equal to the similar peripheral measurement of the body.

7. A product suitable for building purposes which comprises a plate-like body, each of the edges of which has a pointed arched cross-section.

8. A product suitable for building purposes which comprises a plate-like body, the opposite faces of which converge at each of the sides of the body to meet in well-defined edges which lie between the planes of the non-converging portions of said faces.

9. A product suitable for building purposes which comprises a core of hardened, plastic material of plate-like form, one face of the core having crests and depressions of substantial size, and a two-piece jacket of flexible fibrous material applied to the faces of the core, the jacket conforming to the irregularities of the said face and enclosing the opposite faces and all edges of the core without substantial overlap of the pieces thereof.

10. A product suitable for building purposes which comprises a plate-like core of hardened plastic material and a two-piece jacket of flexible fibrous material permanently affixed to the core and extending over both faces and at least a pair of edges thereof, the ends of the pieces meeting at said edges without substantial overlap.

In testimony whereof I affix my signature.

THOMAS ROBINSON.